(12) United States Patent
Smith

(10) Patent No.: US 6,935,035 B2
(45) Date of Patent: Aug. 30, 2005

(54) SLOPEMASTER

(76) Inventor: Ronald Dean Smith, 601 Oakley Ave., Roanoke Rapids, NC (US) 27870

( * ) Notice: Subject to any disclaimer, the term of this patent is extended or adjusted under 35 U.S.C. 154(b) by 0 days.

(21) Appl. No.: 10/952,011

(22) Filed: Sep. 28, 2004

(65) Prior Publication Data

US 2005/0034315 A1 Feb. 17, 2005

Related U.S. Application Data

(63) Continuation-in-part of application No. 10/085,854, filed on Feb. 27, 2002, now abandoned.
(60) Provisional application No. 60/271,749, filed on Feb. 27, 2001.

(51) Int. Cl.[7] ............................................. G01C 9/12
(52) U.S. Cl. ....................... 33/391; 33/371; 33/DIG. 1
(58) Field of Search ............................. 33/1 H, DIG. 1, 33/332–334, 368, 370, 371, 391, 396, 402, 521; 116/215, 284, 291, 327, 328, 331

(56) References Cited

U.S. PATENT DOCUMENTS

| | | | |
|---|---|---|---|
| 922,960 A | * | 5/1909 | Schatz .......................... 33/368 |
| 1,709,227 A | | 4/1929 | Norgaard |
| 2,045,631 A | | 6/1936 | Cavender |
| 2,201,941 A | | 5/1940 | Behr |
| 2,644,244 A | | 7/1953 | Horton et al. |
| 2,694,865 A | | 11/1954 | Le Pera |
| 2,847,765 A | | 5/1958 | Bateman |
| 3,012,537 A | | 12/1961 | Thiel |
| 3,800,426 A | * | 4/1974 | Nakamura .................... 33/368 |
| 3,817,625 A | * | 6/1974 | Jordan ..................... 33/366.11 |
| 3,945,391 A | * | 3/1976 | Pearse .......................... 33/396 |
| 3,956,831 A | | 5/1976 | Sibley |
| 4,063,366 A | | 12/1977 | Bane |
| 4,188,729 A | | 2/1980 | Peterson |
| 4,383,374 A | | 5/1983 | Bertero |
| 4,608,761 A | * | 9/1986 | Small .......................... 33/471 |
| 4,843,725 A | | 7/1989 | Harris |
| 4,995,169 A | | 2/1991 | Ludén |
| 6,032,376 A | | 3/2000 | Shurtleff |
| 6,073,356 A | | 6/2000 | Li |
| 6,357,128 B1 | | 3/2002 | Iden |
| 6,636,155 B2 | | 10/2003 | Elizondo-Salinas |
| 2003/0084581 A1 | | 5/2003 | Dougherty |

* cited by examiner

Primary Examiner—G. Bradley Bennett
(74) Attorney, Agent, or Firm—Jerry A. Miller; Miller Patent Services

(57) ABSTRACT

A slope measurement instrument consistent with certain embodiments has a magnetic base with a compartment attached to the magnetic base, the compartment having an inner face and a clear outer face, with the inner face having indicia of angular graduations thereon, the indicia being viewable through the outer face. The angular graduations are arranged in a semi-circular pattern with a zero grade position at the bottom and increasing angles indicated on either side of the bottom. An indicator needle is pivotally suspended so that gravitational forces acting on the needle cause the needle to point to the zero grade position when the instrument is positioned at a zero degree grade. A fluid disposed within the compartment between the inner face and the outer face to stabilize movement of the needle. The volume of the fluid can be adjusted to adjust the amount of fluid stabilizing effect provided for various conditions. This abstract should not be considered limiting, since other embodiments may incorporate more, fewer or different elements that those described in this abstract.

20 Claims, 9 Drawing Sheets

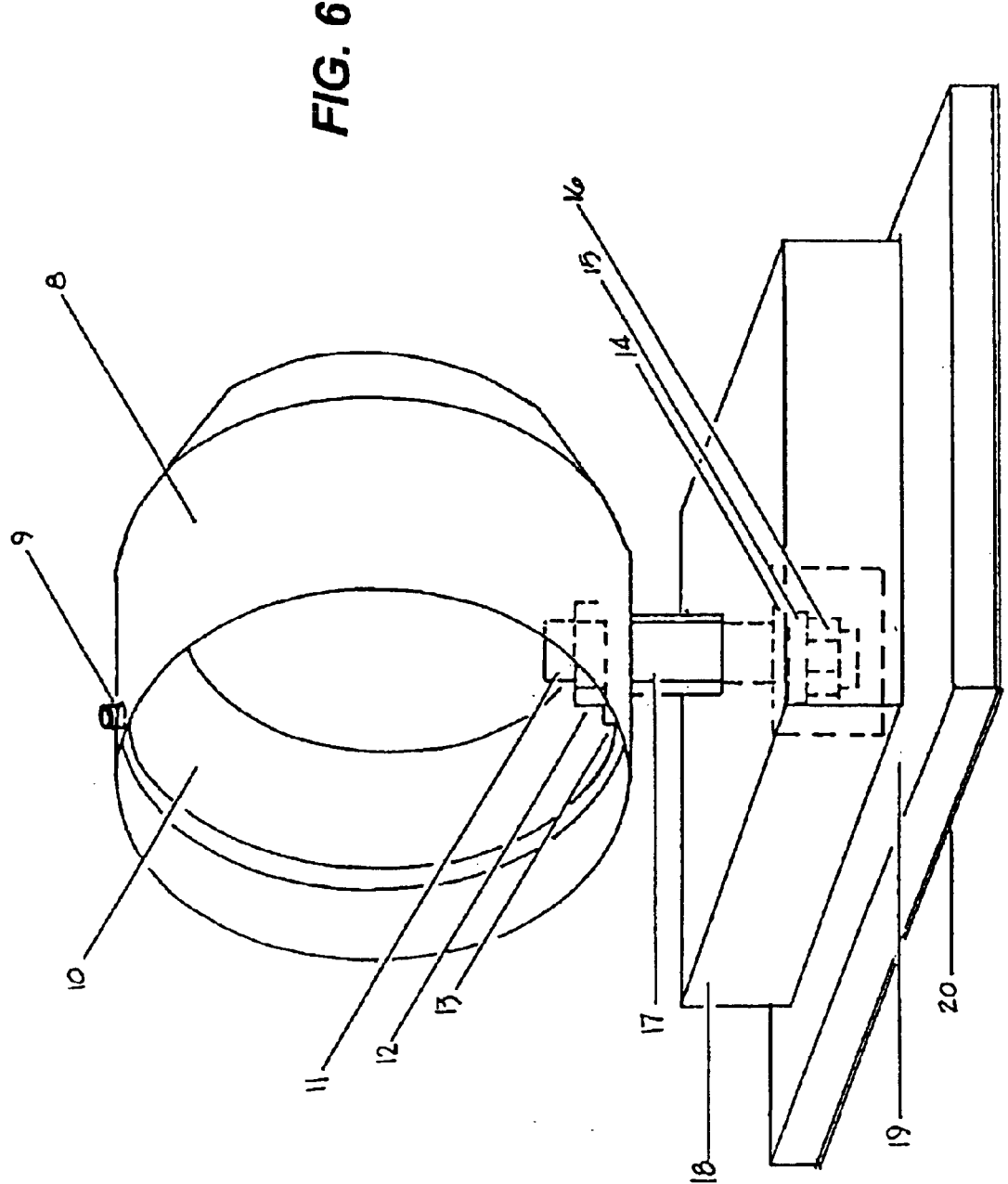

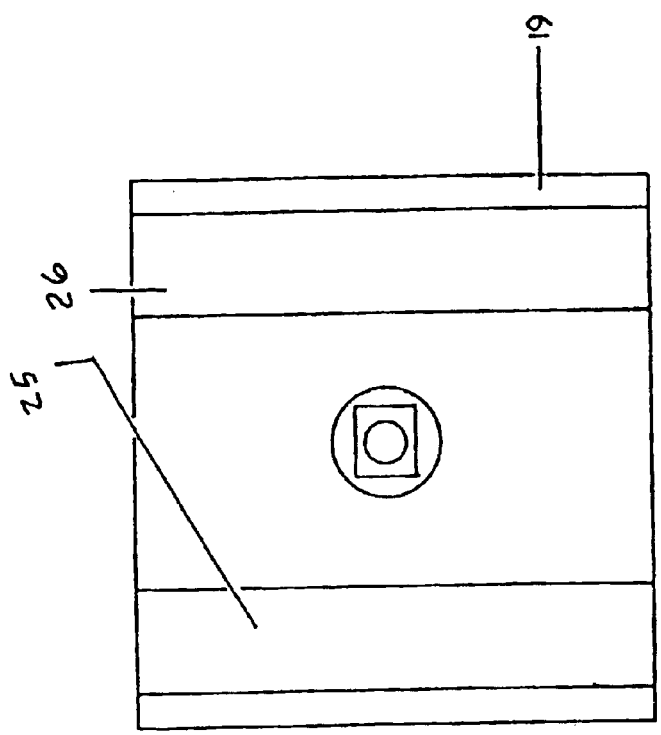
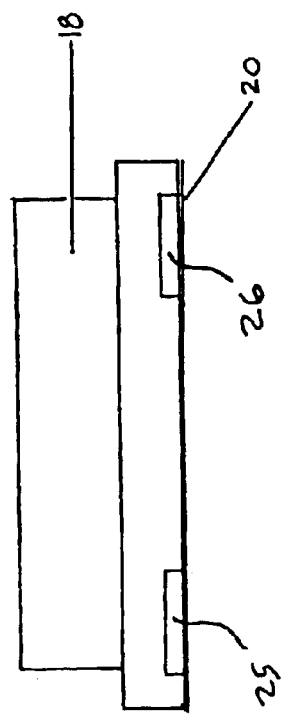
FIG. 10
FIG. 11

SLOPEMASTER

CROSS REFERENCE TO RELATED DOCUMENTS

This application is a continuation in part of U.S. patent application Ser. No. 10/085,854, filed Feb. 27, 2002, which claims priority benefit of U.S. Provisional Patent Application Ser. No. 60/271,749 filed Feb. 27, 2001, both of which are hereby incorporated herein by reference.

TECHNICAL FIELD

The present invention, in accordance with certain embodiments, is used to detect the grade on all slopes in highway construction using a degree gauge. The present invention, in accordance with certain embodiments, relates to highway grading and more particularly to grading slopes with minimum time needed.

BACKGROUND

Conventional grade prep practice for cutting slopes is often very costly and time consuming. Stakes have to be inserted into the ground manually and constantly removed and repeated versus laser methods which are extremely costly and require the machine in use to operate slowly to pick up signals. The methods discussed above cause frustration for machine operators and laborers, as well as costliness for the companies. Therefore, there continues to be a need for a better process for grading slopes.

BRIEF DESCRIPTION OF THE DRAWINGS

Certain exemplary embodiments may be best understood by reference to the following detailed description taken in conjunction with the accompanying drawings in which:

FIG. 6 is perspective view of an embodiment of a highway grade instrument consistent with the present invention.

FIG. 10 is a base detail bottom view of an embodiment of highway grade instrument consistent with the present invention FIG. 11 is a base detail side view of the an embodiment of a highway grade instrument consistent with the present invention

DETAILED DESCRIPTION

Figure 1:
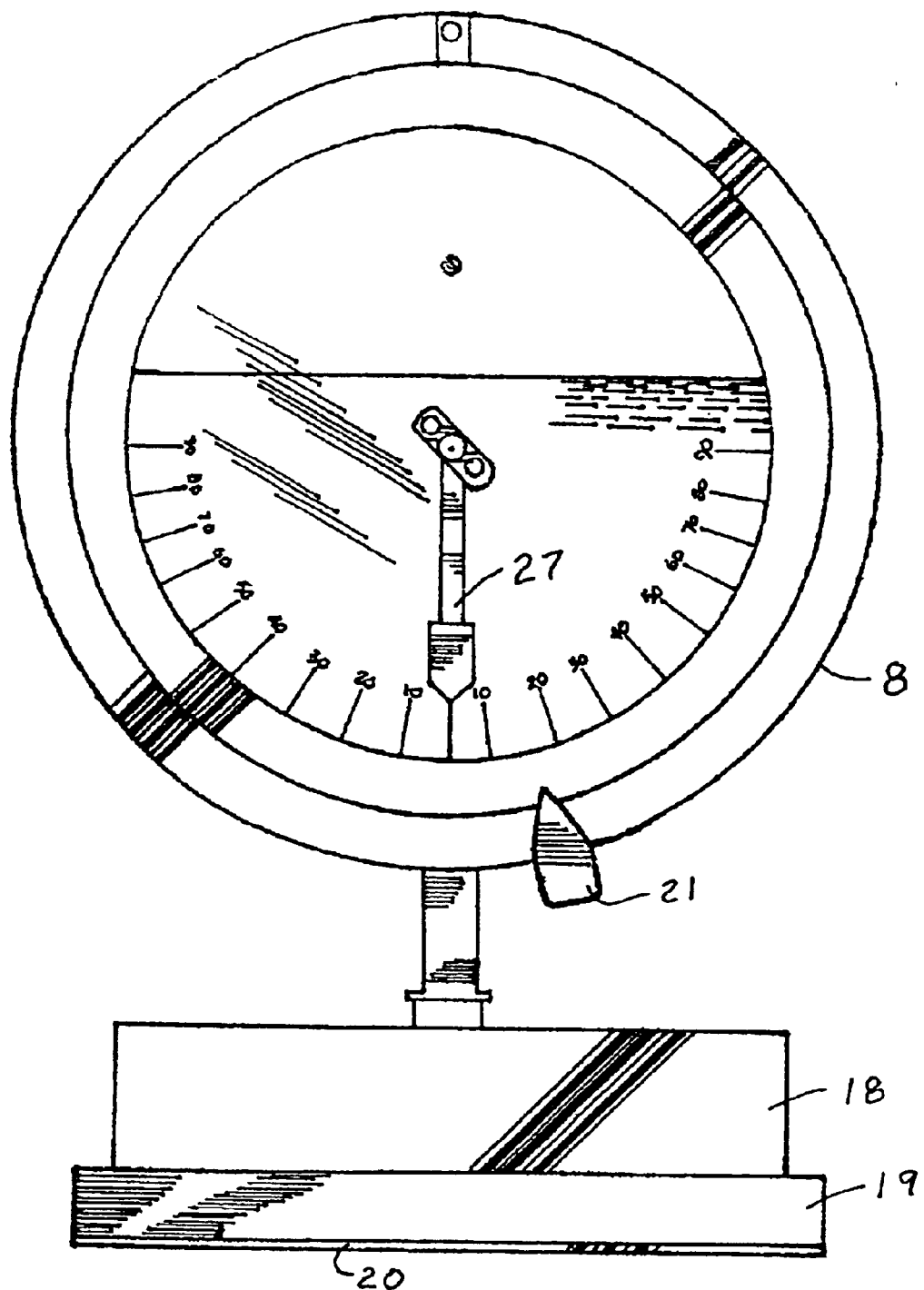
FIG. 1 is a front view of an embodiment of a highway grade instrument consistent with the present invention.

There is shown in the drawings and will herein be described in detail specific embodiments, with the understanding that the present disclosure is to be considered as exemplary and is not intended to limit the invention to the specific embodiments shown and described. In the description below, like reference numerals are used to describe the same, similar or corresponding parts in the several views of the drawings.

The present invention, in accordance with certain embodiments, relates to a highway grade instrument (the Slopemaster) that is used in conjunction with earth moving machines (e.g., graders that use a scraper to form slopes in the earth) grades slopes with minimum time involved. The highway grade instrument consistent with certain embodiments of the present invention includes a degree scale. Glycerin or other liquid, is used as a stabilizer to dampen the responsiveness of an indicator needle according to certain embodiments. A magnetized base makes the device movable from one earth moving machine to another.

Other objects and advantages will become apparent and obvious from a study of the following description and the accompanying drawings which are merely illustrative of such invention.

Figure 2:
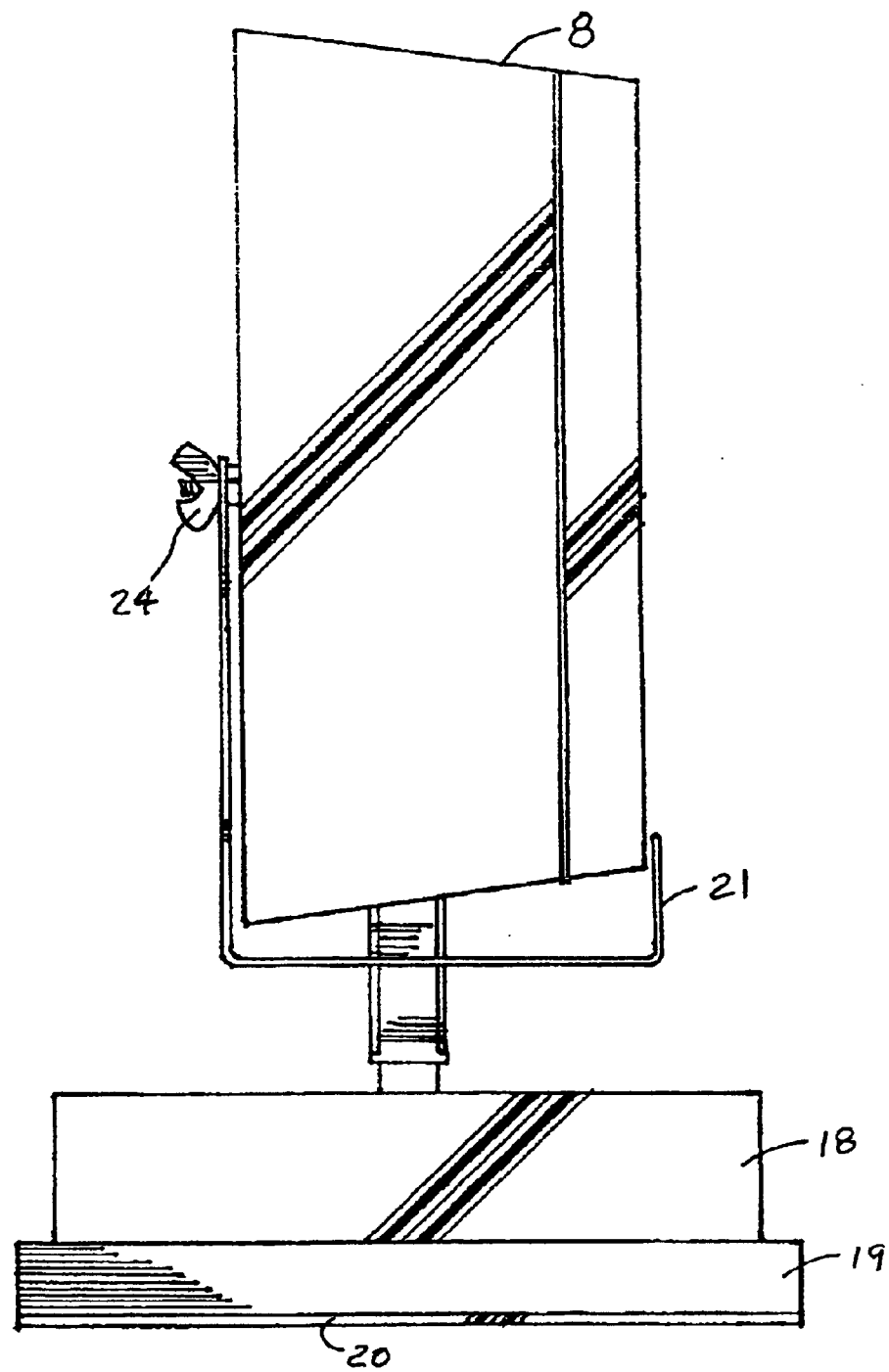
FIG. 2 is a side view of an embodiment of highway grade instrument consistent with the present invention
Figure 3:
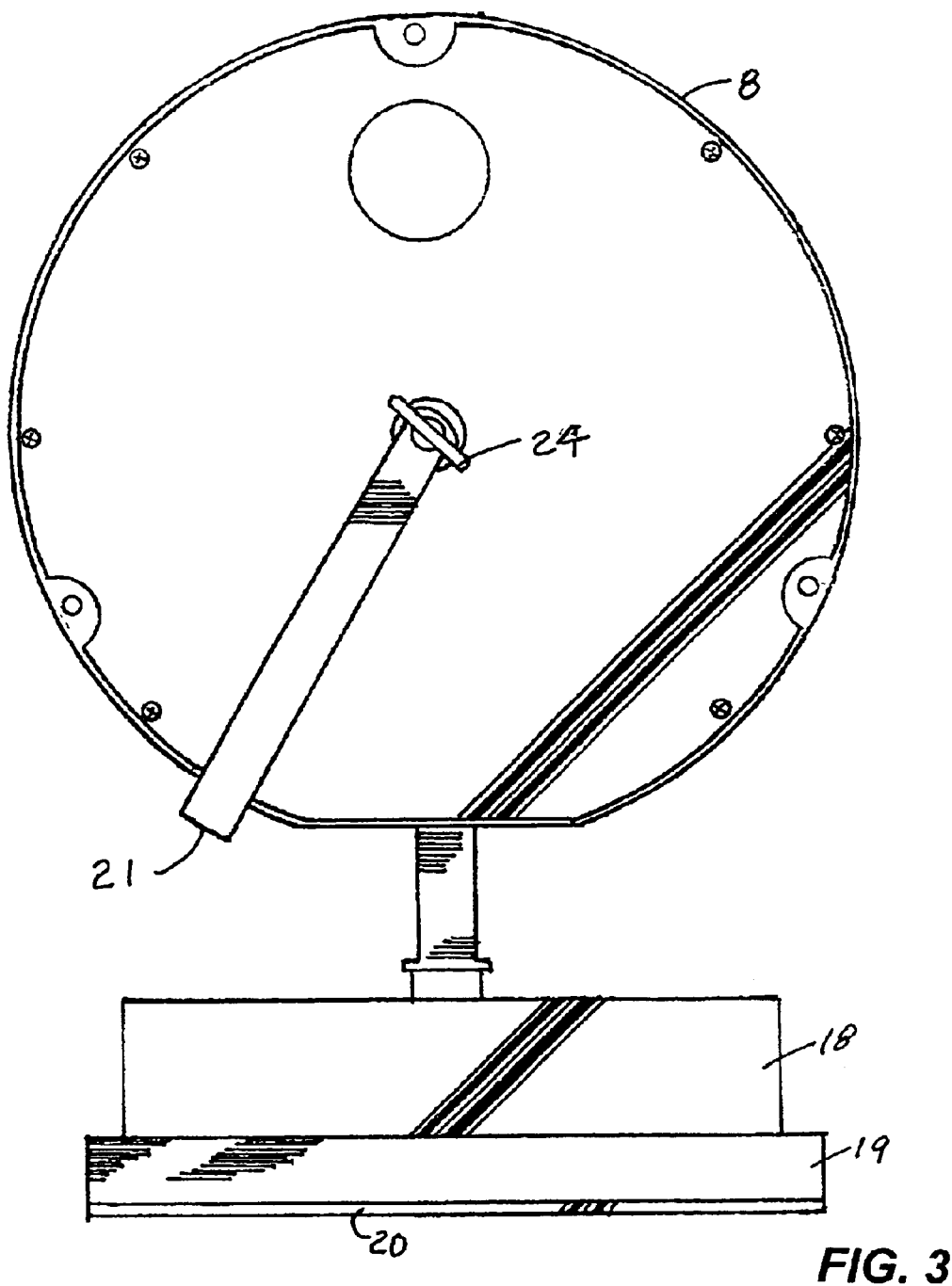
FIG. 3 is a rear view of an embodiment of a highway grade instrument consistent with the present invention
Figure 12:
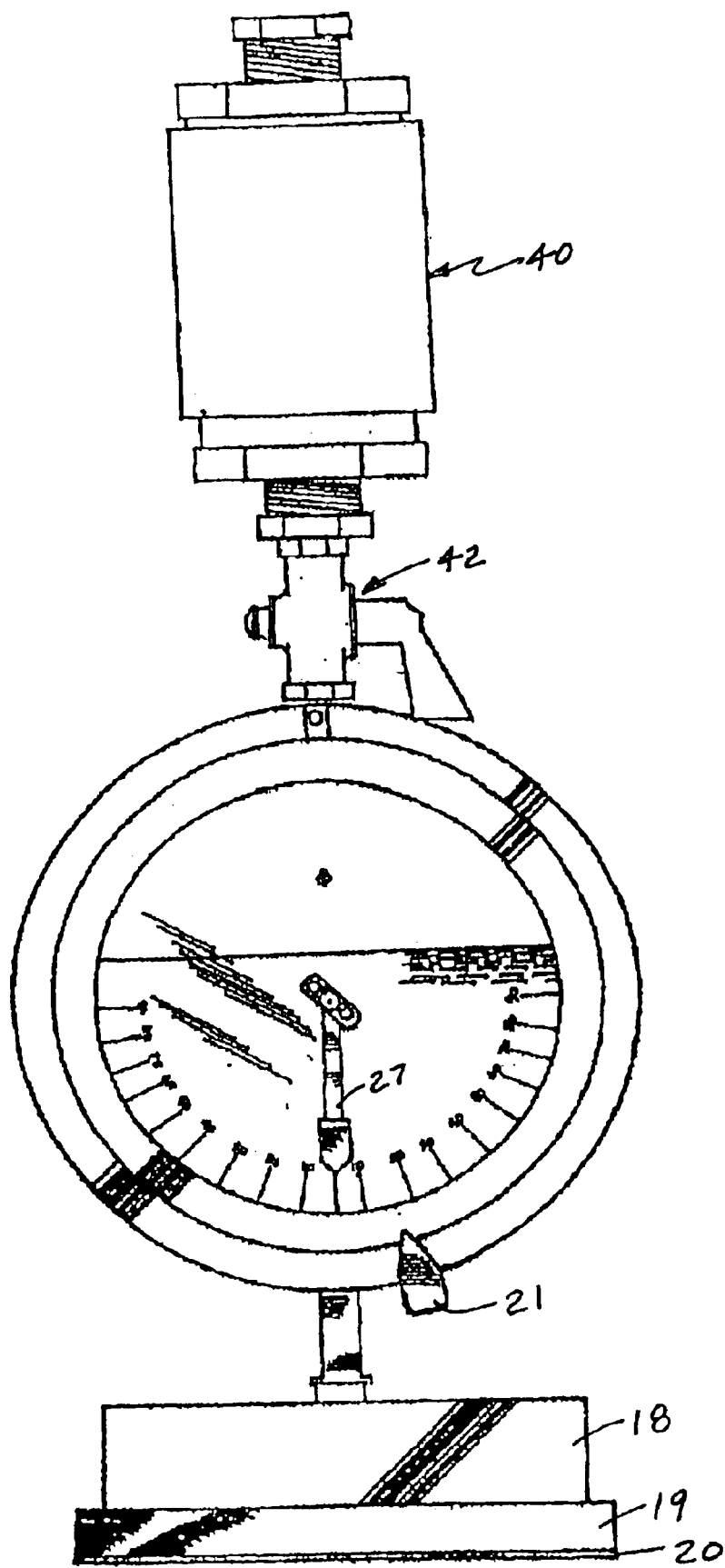
FIG. 12 is a front view of another embodiment of a highway grade instrument consistent with the present invention utilizing a fluid adjustment mechanism.
Figure 13:
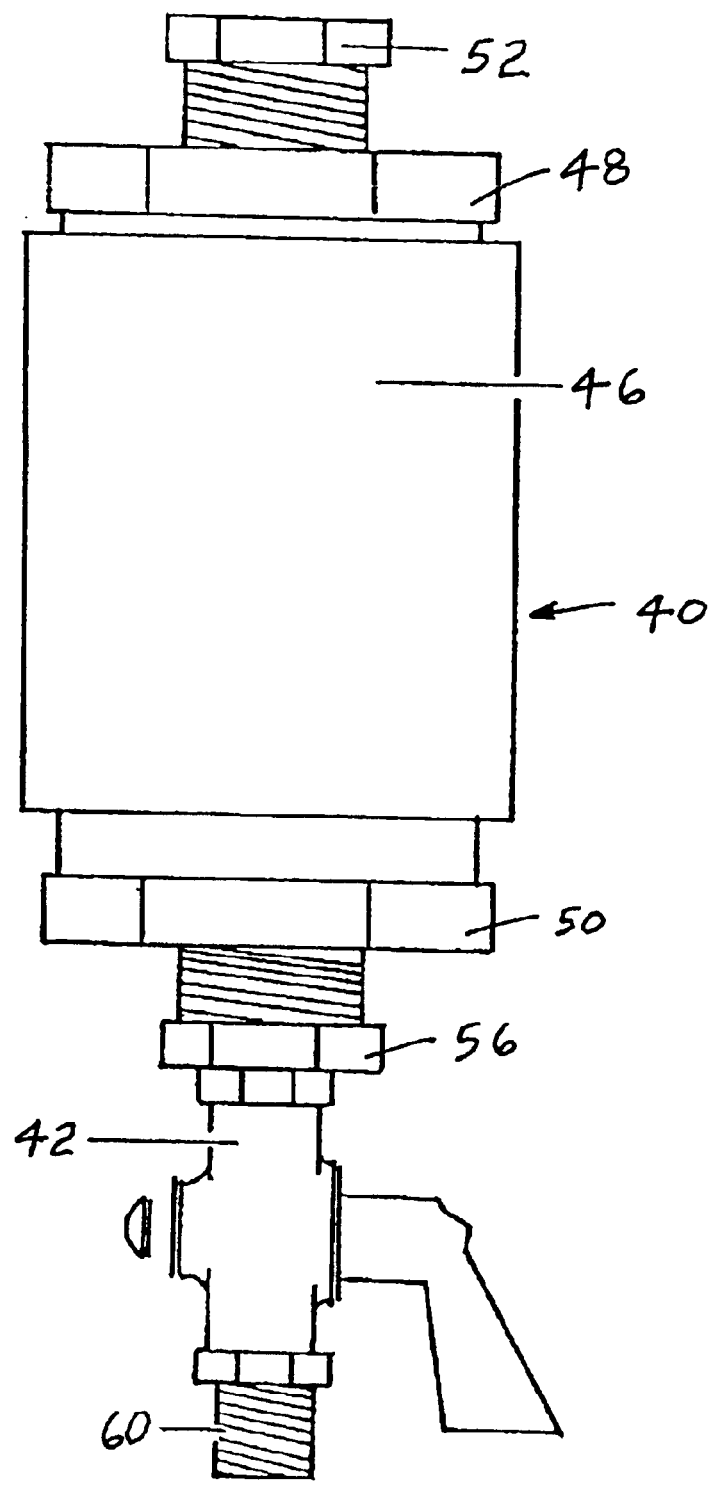
FIG. 13 is a detail view of a fluid adjustment mechanism of an embodiment of a highway grade instrument consistent with the present invention.

With reference to the drawings, several embodiments of the highway grade instrument of the present invention is shown therein. FIGS. 1–3 depict three views of a first embodiment. FIGS. 4–11 provided detailed views of a first prototype embodiment. FIGS. 12–13 depict an improvement using a fluid reservoir 40 and a valve 42 to provide a mechanism for easily adjusting the fluid volume within the main housing 8. As will be appreciated from subsequent portions of this disclosure, the highway grade instrument consistent with certain embodiments facilitates efficiently grading slopes using earth moving equipment such as a grader machine.

Before describing the structure of the highway grade instrument in detail, it may be beneficial to review the basic components of the measurement instrument as shown in the various views of the drawing FIGS. 1–13. In this regard, the highway grade instrument is a versatile gauge and accordingly includes a precision needle indicator 27 in glycerin oil. A formula can be used to determine the grade on all slopes in highway construction and the like using a degree gauge. (Example: 2 to 1 slope=26½ degrees).

The outer face 2 is preferably clear or transparent plastic such as plexiglas or lexan™ and measures 4¼ inches in diameter in this embodiment. The round inner face 5 in this example is a white light gauge metal with a 1½ inch red end arrow indicator. This inner face 5 at the bottom center indicates 0 degrees. From right to left the inner face is marked every 5/100 and from left to right the inner face is marked every 5/100. The gauge is numbered from 0 to 90 degrees in a semicircular arrangement both ways. By permitting the scale to read zero at the bottom and having the angular graduations arranged in a semi-circular pattern with increasing angles indicated on either side of the bottom, an indicator needle 27 can be pivotally suspended so that gravitational forces acting on the needle 27 itself cause the needle 27 to point to the zero grade position when the instrument is positioned at a zero degree grade (i.e., when the bottom of the base is horizontal). This results in a simple design that is free of the need for counterweights on the indicator needle 27.

Glycerin oil fluid normally fills the compartment between the outer face 2 and the inner face 5 of housing 8 by about ¾ of the height of the compartment. This fluid acts a stabilizer for the needle 27 indicator gauge. However, in environments, it may be desirable to adjust the volume of fluid used. For example, in choppy terrain, somewhat more fluid may be used to stabilize the needle 27. In cold weather, the viscosity of the fluid will change causing the needle to react very slowly. When faster response is needed (smooth terrain or cold weather), fluid can be removed from the compartment.

In one embodiment, fluid can be adjusted in the housing compartment of housing 8 by use of a fluid reservoir 40 in communication with the compartment through a valve 42. The user can open the valve 42 and transfer fluid from the compartment of housing 8 to the reservoir or from the reservoir to the compartment as desired to achieve the desired responsiveness or damping of the needle 27.

In the preferred embodiment, the entire face is encased in industrial plastic with a depth of 2½ inches, but of course, this or any other dimensions provided herein should not be considered limiting. The 6 inch lever pointer 21 has a wing nut 24 attaching to the back center of the housing 8 ending with a 1 and ¾ inch red tip that points to the grade setting desired.

The entire face sits on a metal stem 17 with a diameter of about ½ inch. This stem is positioned into a solid heavy plastic mounting block 18 measuring about 4½ inches by about 4½ inches with a height of about 1 inch.

The mounting sits on a base block 19 measuring about 5 inches by 5 inches and is about ⅝ inch high. Magnets 25 and 26 are embedded in block 19 to permit the instrument to be secured to a horizontal metal part of the particular machine currently in use. Attached to the magnet bottom is approximately 1/16 inch rubber mat 20 measuring about 5 inches by 5 inches.

Figure 4:
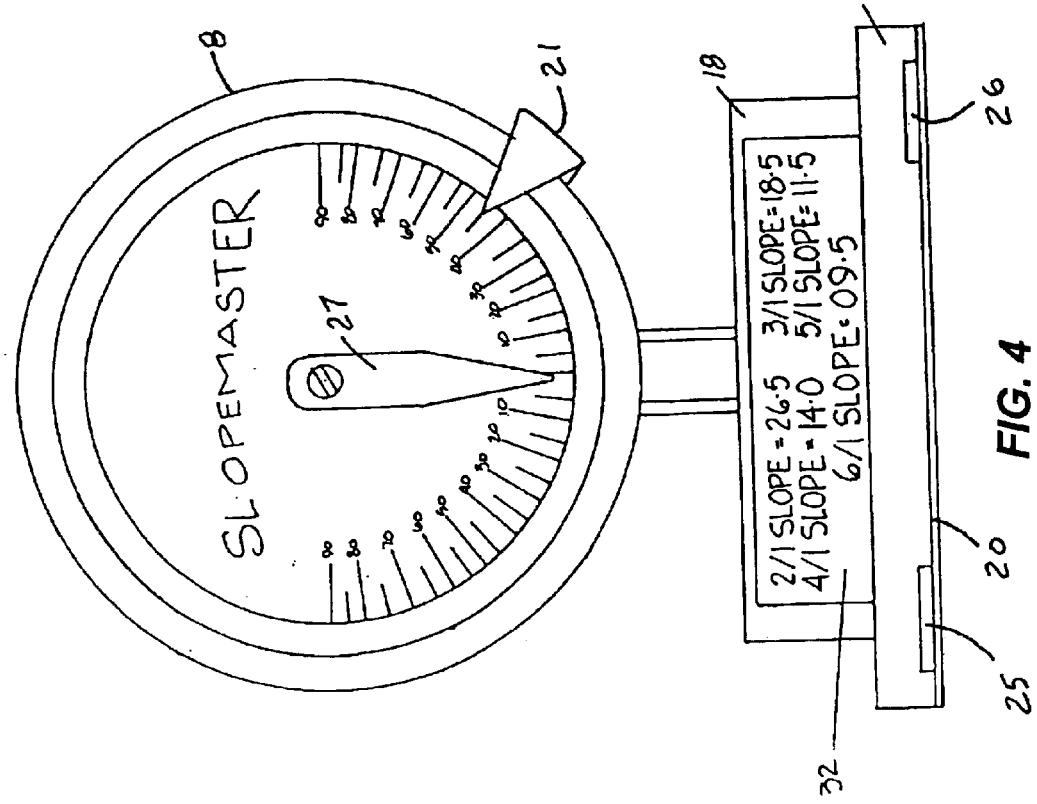
FIG. 4 is a front view of an embodiment of a highway grade instrument consistent with the present invention.

The slope measurement device (Slopemaster) as depicted in FIGS. 1–11 shows an embodiment in which the amount of fluid used to dampen the movement of the indicator needle is fixed, or only adjustable by removal of plug 9. In these embodiments, the measurement device housing 8 is mounted to a base assembly made up of two high density plastic rectangles that are cemented together. The base assembly is detailed in FIGS. 10–11. The upper rectangle 18 measures 4.375 inches square by 1.0 inches high and is cemented and screwed to the lower rectangle 19. Rectangle 19 measures 5.0 inches square by 0.625 inches high. The bottom of the base has two strips cut 0.375 inches deep where two ceramic magnets 25 and 26 are cemented into the base so as to be approximately flush with the bottom as shown in FIGS. 4 and 11. A 0.62 inch thick foam rubber pad 20 is glued to the bottom of the base to prevent scratching of metal when the instrument is attached to a vehicle body by the magnetic base.

Figure 5:
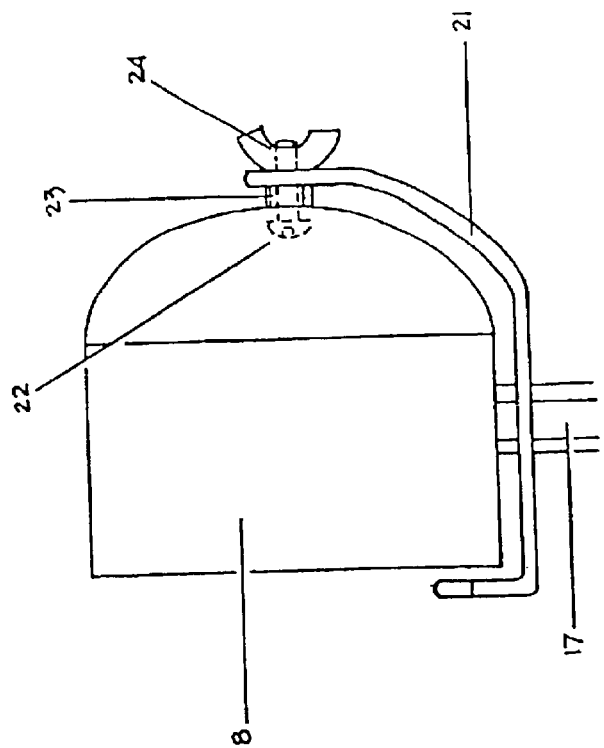
FIG. 5 is a side view of an embodiment of highway grade instrument consistent with the present invention showing the slope arm assembly detail.

FIG. 6 shows a threaded rod 11 is attached to the base by means of flat washer 14, lock washer 15 and a 0.375 inch nut 16. The housing 8 prototype is made from a PVC cap for a four inch service pipe. In the interior of the housing, a 1.187 inch wide section of four inch PVC pipe 10 is cemented to the interior wall as a stop for the faceplate assembly. The threaded rod 11 which attaches the housing to the base also goes through this stop and is secured with washer 13 and nut 12. A spacer stem 17 sets the space between the base block 18 and the housing 8. In the embodiment shown in FIG. 3, a separate rear wall is attached to the back using screws and a seal instead of using a PVC service pipe cap as depicted in FIG. 5. Those skilled in the art will appreciate that many variations in the housing 8 are possible without departing from embodiments consistent with the present invention.

In the center of the upper wall of the housing is a 0.218 inch hole that lines up with the hole in the faceplate assembly. In one embodiment, this is hole that is used for partially filling the chamber with liquid or for removal of excess liquid to serve as a damping fluid for the indicator needle 27. A set screw 9 is inserted in threaded hole to serve as a plug after the liquid is injected or poured into the compartment. The volume of fluid within the compartment can be increased or decreased as desired by injecting (or pouring) fluid in or drawing (or pouring) fluid out of the threaded hole with the plug 9 removed.

Figure 8:
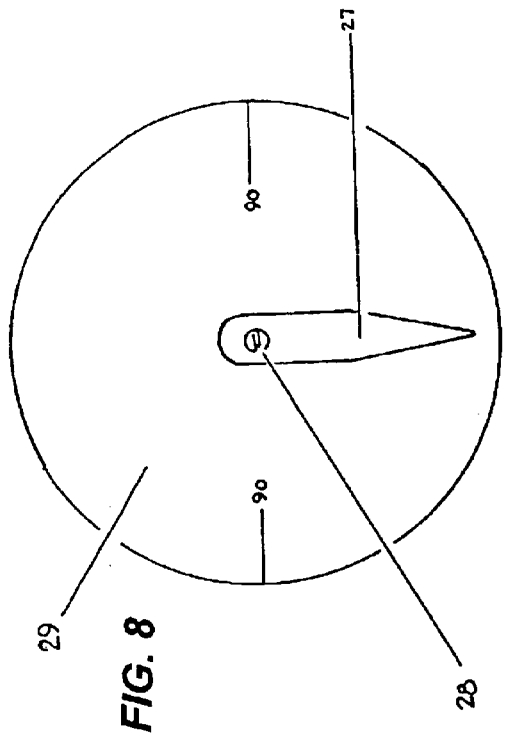
FIG. 8 is a front view of slope indicator needle of an embodiment of a highway grade instrument consistent with the present invention
Figure 9:
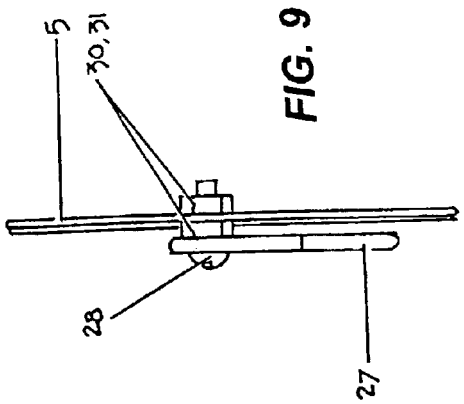
FIG. 9 is a side detail view of the slope indicator needle of an embodiment of a highway grade instrument consistent with the present invention.
Figure 7:
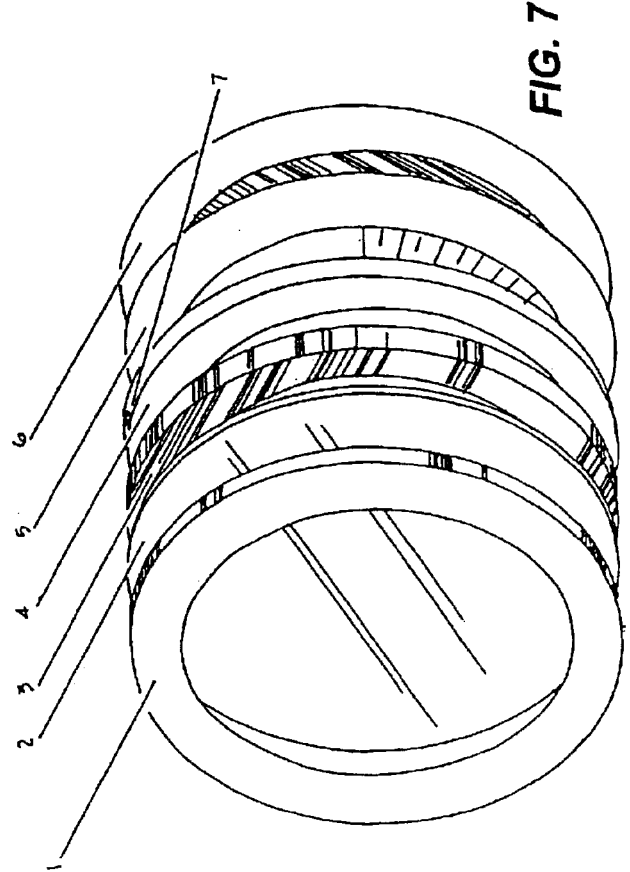
FIG. 7 is an exploded view of a face plate assembly of an embodiment of highway grade instrument consistent with the present invention.

The faceplate assembly and indicator assemblies are shown in FIG. 7–9. The faceplate assembly of this embodiment is a six part assembly starting at the rear with a four inch knockout plug 6, which is cemented with silicon to the stop 10 to form a watertight seal. Attached, also by silicone, to the front of the knockout plug is the dial face, which has an aluminum back 5, with a vinyl printed self-adhesive decal 29, that bears the logo and the angle register marks. These marks, at five degree intervals in this embodiment, line up with the exterior slope arm that serves as an adjustable pointer to show the angle of the blade on the grader machine forming the slope in the earth. Other mechanisms can also be provided to serve as the adjustable pointer including pointers that are attached from the front or the perimeter of the housing without limitation.

The next piece of the assembly is a 0.468 section of PVC 4 cemented to the dial face and the sides of the housing. There is a hole 7 in the top of this piece that lines up with the hole in the housing wall and allows the injection of 96% natural glycerin, or other suitable damping fluid, after assembly. Cemented to the front of 4 is a cork gasket 3 which is also cemented with silicone and helps to seal the area where the glycerin will be maintained. Next, cemented to the front side of the cork ring, is a piece of 0.093 inch thick plexiglass 2 that allows viewing of the dial face and serves as a barrier wall of the compartment holding the glycerin. The glycerin stabilizes the indicator needle 27 without use of counterweights or attached fins or paddles, thus dramatically simplifying design and permitting user adjustment of responsiveness by simply adding or removing fluid. The glycerin steadies the indicator needle 27 while the Slopemaster is in motion. This has been tested and proven positive in the field. The front piece in the assembly is a 0.125 section of PVC 1, which is cemented with silicon to the plexiglass and the interior of the housing, completing the seal. The indicator needle 27, in one embodiment, is a brass tooled arrow shaped needle that is 3/16" wide and is attached to the dial face 5 by a small brass bolt 28 and bound by two brass nuts 30 and 31, one on each side of the dial face and vinyl decal.

The slope arm 21 is attached to the housing 8 by a brass bolt 22, a brass nut 23 and a brass wing nut 24. The wing nut 24 allows easy adjustment of the slope arm 21 so as to serve as an adjustable pointer which is lined up with the appropriate degree mark on the dial face to give correct slope angle to the grader. This slope angle then serves as a target angle for the grading operation which the operator seeks to match with the indicator needle 27. On the front of the upper portion of the base is attached, with self adhesive backing, an engraved plate 32, with degrees of angles needed to maintain the five most common desired slopes while earth grading. These five slopes are shown in the TABLE below. Other slopes may also be shown on the engraved plate or elsewhere on the instrument including the face plate, and may be implementing using techniques other than engraving. The indicator works as a gravity powered plumb bob with a small margin for error as the needle 27 is aligned with the slope arm 21 to produce the desired slope.

TABLE

| SLOPE | ANGLE (degrees) |
| --- | --- |
| 2 to 1 | 26.5 |
| 3 to 1 | 18.5 |
| 4 to 1 | 14.0 |
| 5 to 1 | 11.5 |
| 6 to 1 | 9.5 |

FIG. 12 depicts another embodiment consistent with the present invention in which the volume of fluid within the compartment of housing 8 can be adjusted. With changing temperature, the viscosity of the fluid within housing 8 may change resulting in an undesirable level of damping of the indicator needle 27. In cold weather, the needle movement may become too heavily damped with a given amount of fluid. In hot weather, that same amount of fluid may not provide enough damping. Similarly, when the terrain smooth, a given amount of fluid may be appropriate, but may result in too little needle movement when the terrain is "choppy". Accordingly, in the present embodiment, a fluid reservoir 40 is provided which is in fluid communication with the inner area of housing 8 through valve 42. By opening valve 42, fluid can be easily added to the housing 8. The valve 42 can be closed when the desired level of fluid is achieved. Similarly, fluid can be removed from housing 8 by inverting the assembly with the valve open so that fluid flows from the housing to reservoir 40. When the desired fluid level is achieved, the valve 42 is closed.

A prototype reservoir assembly is depicted in FIG. 13. The reservoir chamber can be made of a length of PVC pipe, that is dimensioned to hold a desired amount of fluid, with a female thread adapter 48 and 50 at each end. At the top, the reservoir 40 is sealed with a threaded plug 52. At the lower end, a valve 42 is threaded into the thread adapter 50. As shown, an adapter 56 adapts the female threads of 50 to a smaller size to accommodate the valve 42. The lower side of valve 42 is threaded and is screwed into the top of housing 8 in place of plug 9. Many variations in this arrangement are possible, since the embodiment depicted is simply a prototype devised for testing and proof of concept.

Thus, in accordance with certain embodiments, a slope measurement instrument has a magnetic base with a compartment attached to the magnetic base. The compartment has an inner face and a clear outer face, with the inner face having indicia of angular graduations thereon, the indicia being viewable through the outer face. The angular graduations are arranged in a semi-circular pattern with a zero grade position at the bottom and increasing angles indicated on either side of the bottom. An indicator needle is pivotally suspended so that gravitational forces acting on the needle cause the needle to point to the zero grade position when the instrument is positioned at a zero degree grade. A fluid is disposed within the compartment between the inner face and the outer face to stabilize movement of the needle. A mechanism is provided for adjustment of volume of fluid within the compartment.

Another slope measurement instrument consistent with certain embodiments has a magnetic base. A cylindrical compartment is attached to the magnetic base, the compartment having an inner face and a clear outer face, with the inner face having indicia of angular graduations thereon, the indicia being viewable through the outer face. The angular graduations are arranged in a semi-circular pattern with a zero grade position at the bottom and increasing angles indicated on either side of the bottom. An indicator needle is pivotally suspended so that gravitational forces acting on the needle cause the needle to point to the zero grade position when the instrument is positioned at a zero degree grade. A fluid is disposed within the compartment between the inner face and the outer face to stabilize movement of the needle. An adjustable pointer that can be set at a desired slope, whereby a user can maintain a desired grade by matching the indicator needle with the adjustable pointer, wherein the adjustable pointer is attached to a rear side of the compartment and can be rotated to a desired grade. A mechanism is provided for for adjustment of volume of fluid within the compartment.

Another slope measurement instrument has a magnetic base. A cylindrical compartment is attached to the magnetic base, the compartment having an inner face and a clear outer face, with the inner face having indicia of angular graduations thereon, the indicia being viewable through the outer face. The angular graduations are arranged in a semi-circular pattern with a zero grade position at the bottom and increasing angles indicated on either side of the bottom. An indicator needle is pivotally suspended so that gravitational forces acting on the needle cause the needle to point to the zero grade position when the instrument is positioned at a zero degree grade. A fluid is disposed within the compartment between the inner face and the outer face to stabilize movement of the needle, wherein the fluid comprises glycerine oil. A fluid reservoir is provided along with a valve that selectively permits fluid communication between the compartment and the fluid reservoir to permit adjustment of the volume of fluid in the compartment.

While specific embodiments have been described, it is evident that many alternatives, modifications, permutations and variations will become apparent to those skilled in the art in light of the foregoing description.

What is claimed is:

1. A slope measurement instrument, comprising in combination:

a magnetic base;

a compartment attached to the magnetic base, the compartment having an inner face and a clear outer face, with the inner face having indicia of angular graduations thereon, the indicia being viewable through the outer face;

the angular graduations being arranged in a semi-circular pattern with a zero grade position at the bottom and increasing angles indicated on either side of the bottom;

an indicator needle pivotally suspended so that gravitational forces acting on the needle cause the needle to point to the zero grade position when the instrument is positioned at a zero degree grade;

a fluid disposed within the compartment between the inner face and the outer face to stabilize movement of the needle; and means for adjustment of volume of fluid within the compartment.

2. The slope measurement instrument according to claim 1, wherein the means for adjusting comprises:

a fluid reservoir; and a valve that selectively permits fluid communication between the compartment and the fluid reservoir.

3. The slope measurement instrument according to claim 1, further comprising an adjustable pointer that can be set at a desired slope, whereby a user can maintain a desired grade by matching the indicator needle with the adjustable pointer.

4. The slope measurement instrument according to claim 3, wherein the adjustable pointer is attached to a rear side of the compartment and can be rotated to a desired grade.

5. The slope measurement instrument according to claim 3, wherein the adjustable pointer is locked to the desired grade using a wing nut.

6. The slope measurement instrument according to claim 1, wherein the fluid comprises glycerin oil.

7. The slope measurement instrument according to claim 1, wherein the angular graduations are arranged in the semi-circular pattern with a zero grade position at the bottom and increasing angles to 90 degrees indicated on either side of the bottom.

8. The slope measurement instrument according to claim 1, further comprising a conversion plate bearing a legend that converts slopes to angular measurement in degrees.

9. A slope measurement instrument, comprising in combination:
   a magnetic base;
   a cylindrical compartment attached to the magnetic base, the compartment having an inner face and a clear outer face, with the inner face having indicia of angular graduations thereon, the indicia being viewable through the outer face;
   the angular graduations being arranged in a semi-circular pattern with a zero grade position at the bottom and increasing angles indicated on either side of the bottom;
   an indicator needle pivotally suspended so that gravitational forces acting on the needle cause the needle to point to the zero grade position when the instrument is positioned at a zero degree grade;
   a fluid disposed within the compartment between the inner face and the outer face to stabilize movement of the needle;
   an adjustable pointer that can be set at a desired slope, whereby a user can maintain a desired grade by matching the indicator needle with the adjustable pointer, wherein the adjustable pointer is attached to a rear side of the compartment and can be rotated to a desired grade; and
   means for adjustment of volume of fluid within the compartment.

10. The slope measurement instrument according claim 9, wherein the means for adjusting comprises:
   a fluid reservoir; and
   a valve that selectively permits fluid communication between the compartment and the fluid reservoir.

11. The slope measurement instrument according to claim 9, wherein the adjustable pointer is locket to the desired grade using a wing nut.

12. The slope measurement instrument according to claim 9, wherein the fluid comprises glycerin oil.

13. The slope measurement instrument according to claim 9, wherein the angular graduations are arranged in the semi-circular pattern with a zero grade position at the bottom and increasing angles to 90 degrees indicated on either side of the bottom.

14. The slope measurement instrument according to claim 9, further comprising a conversion plate bearing a legend that converts slopes to angular measurement in degrees.

15. A slope measurement instrument, comprising in combination:
   a magnetic base;
   a cylindrical compartment attached to the magnetic base, the compartment having an inner face and a clear outer face, with the inner face having indicia of angular graduations thereon, the indicia being viewable through the outer face;
   the angular graduations being arranged in a semi-circular pattern with a zero grade position at the bottom and increasing angles indicated on either side of the bottom;
   an indicator needle pivotally suspended so that gravitational forces acting on the needle cause the needle to point to the zero grade position when the instrument is positioned at a zero degree grade; and
   a fluid disposed within the compartment between the inner face and the outer face to stabilize movement of the needle, wherein the fluid comprises glycerine oil.
   a fluid reservoir; and
   a valve that selectively permits fluid communication between the compartment and the fluid reservoir to permit adjustment of the volume of fluid in the compartment.

16. The slope measurement instrument according to claim 15, further comprising an adjustable pointer that can be set at a desired slope, whereby a user can maintain a desired grade by matching the indicator needle with the adjustable pointer.

17. The slope measurement instrument according to claim 16, wherein the adjustable pointer is attached to a rear side of the compartment and can be rotated to a desired grade.

18. The slope measurement instrument according to claim 16, wherein the adjustable pointer is locket to the desired grade using a wing nut.

19. The slope measurement instrument according to claim 15, wherein the angular graduations are arranged in the semi-circular pattern with a zero grade position at the bottom and increasing angles to 90 degrees indicated on either side of the bottom.

20. The slope measurement instrument according to claim 15, further comprising a conversion plate bearing a legend that converts slopes to angular measurement in degrees.

* * * * *